United States Patent [19]
Langer et al.

[11] Patent Number: 5,935,530
[45] Date of Patent: Aug. 10, 1999

[54] EXHAUST GAS CATALYTIC CONVERTER FOR A DIESEL ENGINE

[75] Inventors: Hans-Joachim Langer, Remseck; Bernhard Jokl, Neuhausen, both of Germany

[73] Assignee: Mercedes-Benz AG, Stuttgart, Germany

[21] Appl. No.: 08/841,565

[22] Filed: Apr. 30, 1997

[30] Foreign Application Priority Data

May 2, 1996 [DE] Germany ............... 196 17 563

[51] Int. Cl.$^6$ ................ B01D 53/34
[52] U.S. Cl. ............ 422/177; 422/171; 422/172; 422/182
[58] Field of Search ............ 422/180, 171–179, 422/168–170, 182; 60/299, 300

[56] References Cited

U.S. PATENT DOCUMENTS

| | | | |
|---|---|---|---|
| 4,125,997 | 11/1978 | Abthoff et al. | 60/289 |
| 5,296,198 | 3/1994 | Abe et al. | 422/180 |
| 5,357,749 | 10/1994 | Ohsuga et al. | 60/274 |
| 5,365,733 | 11/1994 | Takeshima et al. | 422/171 |
| 5,510,086 | 4/1996 | Hemingway et al. | 422/171 |

FOREIGN PATENT DOCUMENTS

| | | |
|---|---|---|
| 0 622 107 | 11/1994 | European Pat. Off. . |
| 23 37 228 | 2/1975 | Germany . |
| 28 51 675 | 6/1980 | Germany . |
| 40 32 085 | 4/1992 | Germany . |
| 44 19 776 | 1/1995 | Germany . |
| 43 26 120 | 2/1995 | Germany . |
| 44 36 754 | 4/1995 | Germany . |
| 44 40 833 | 2/1996 | Germany . |

Primary Examiner—Hien Tran
Attorney, Agent, or Firm—Evenson, McKeown, Edwards & Lenahan, P.L.L.C.

[57] ABSTRACT

An exhaust catalytic converter for a Diesel engine that provides for enrichment of the Diesel engine exhaust with hydrocarbons that support nitrogen oxide conversion in the catalyst. The system includes a first catalytic converter stage that is designed for NOx conversion in a first temperature range utilizing a first part of the HC enrichment volume in the exhaust and has a suitable first catalyst material charge for the purpose as well as a second catalytic converter stage that follows the first in the exhaust flow direction, the second stage being designed for NOx conversion in a second temperature range higher than the first and utilizing a second part of the HC enrichment volume in the exhaust, and containing a second catalyst material charge suitable for the purpose. By suitably tuning the system with HC enrichment, reduction of emissions of solid and volatile particles in the Diesel exhaust can be achieved.

11 Claims, 2 Drawing Sheets

EXHAUST GAS CATALYTIC CONVERTER FOR A DIESEL ENGINE

BACKGROUND OF THE INVENTION

This invention relates to an exhaust gas catalytic converter for a Diesel engine. More particularly, this invention relates to a catalytic converter of the type just described comprising means for enriching Diesel engine exhaust with hydrocarbons that support conversion of nitrogen oxides in the catalyst.

This application claims the priority of German Application No. 19617563.1-13, filed in Germany on May 2, 1996, the disclosure(s) of which is (are) expressly incorporated by reference herein.

It is known that conversion, i.e. the reduction of nitrogen oxides contained in the exhaust, is more difficult in Diesel engines by comparison with four-cycle engines by the fact that these engines are not operated around the stoichiometric point of the fuel/air ratio but always with a significant oxygen surplus. Therefore, means are known for enriching Diesel engine exhaust with hydrocarbons that support NOx conversion in the Diesel catalytic converter. For example, there has been proposed an independent injection device for injecting hydrocarbons into the exhaust line. Another proposal takes the form of a secondary injection process in which additional fuel is injected into the combustion chamber after the combustion process proper and then enters the exhaust line unburned. This HC enrichment makes it possible to improve the activity of a Diesel catalytic converter, designed for example as a so-called DeNOx catalytic converter, as far as NOx conversion is concerned within a limited temperature range, whose position on the temperature scale depends on the selected catalyst material and the chosen catalyst loading density. In four-cycle engines on the other hand NOx conversion remains approximately constant above a certain minimum temperature.

Published European application 0 622 107 A2 describes a two-stage exhaust catalytic converter for a Diesel engine in which a front catalytic converter stage (looking in the direction of flow of the exhaust) is designed for low-temperature conversion of hydrocarbons and soluble organic components and is charged with a platinum catalyst for this purpose, while a downstream catalytic converter stage is designed for high-temperature conversion of hydrocarbons and soluble organic components and is charged with a palladium catalyst for this purpose.

To improve exhaust catalytic converter function during cold starting operating phases, especially in four-cycle engines, it is known to provide an HC adsorber material in at least one of the catalytic converter stages. In this way, the hydrocarbons contained in the exhaust, which cannot be completely converted in the cold starting phase because catalyst activity is still limited at this time, are given intermediate storage so that later, after the cold starting phase is over, they can be desorbed and converted. Such systems are disclosed for example in German OS's 43 26 120 A1, 44 19 776 A1, and 44 36 754 A1 as well as in U.S. Pat. No. 5,296,198.

DE 40 32 085 A1 teaches a catalytic converter for reducing nitrogen oxides in exhaust, said converter incorporating at least two catalyst beds connected in series looking in the flow direction of the exhaust, the catalyst beds consisting of different catalyst materials for nitrogen oxide reduction. The different catalyst materials produce their strongest catalytic effects in different, adjacent sections of the relevant exhaust temperature range.

SUMMARY OF THE INVENTION

The primary object of the present invention is to provide an exhaust catalytic converter of the type mentioned at the outset with which good conversion of nitrogen oxides contained in the exhaust of a Diesel engine is achieved over a wide temperature range.

The invention accomplishes this object by providing an exhaust catalytic converter with means for enriching the Diesel engine exhaust with hydrocarbons, the hydrocarbons reinforcing nitrogen oxide conversion in the catalyst, characterized by a first catalytic converter stage designed for NOx conversion in a first temperature range and using a first part of the HC enrichment volume in the exhaust and having a first catalyst material charge suitable for the purpose; and a second catalytic converter stage located downstream from the first in the exhaust flow direction, the second stage being designed for NOx conversion in a second temperature range higher than the first, utilizing a second part of the HC enrichment volume in the exhaust, and a second catalyst material charge suitable for the purpose.

For this purpose, the catalytic converter stages contain a suitable charge of catalyst material, for example different catalyst materials or the same catalyst material with different charging densities. Effective NOx conversion can be achieved in the first, forward catalytic converter stage at comparatively low temperatures and therefore in the cold starting phase itself by choosing a very high charging density of the catalyst material. This conversion also provides the desired heat energy for the exhaust which can be used in the next catalytic converter stage or stages. The second catalytic converter stage located downstream insures effective NOx conversion at higher temperatures at which the NOx conversion rate of the first stage has already dropped off significantly. Characteristically the first catalytic converter stage is designed so that not all of the HC enrichment volume contained in the incoming exhaust, but only a first part thereof, is reacted in it so that a sufficient remaining part of the HC enrichment volume remains for the next, second catalytic converter stage in order to permit effective NOx reduction in this stage as well which is supported by the hydrocarbons.

In another embodiment, the catalytic converter of the present invention has a third catalytic converter stage located in the direction of exhaust flow from the second stage, the third stage being designed with a higher catalytic activity with regard to NOx conversion than the second stage. It turns out that this catalytic converter design produces very effective NOx conversion over a broad temperature range.

In another embodiment, at least the second catalytic converter stage is provided with an HC adsorber material in order to be able to store, on an intermediate basis, hydrocarbons from the HC-enriched exhaust in engine operating phases during which the exhaust contains comparatively little nitrogen oxide and therefore fewer hydrocarbons are required to convert it. The intermediately stored hydrocarbons are then available during operating phases with higher nitrogen oxide concentrations in the exhaust, for example during operating phases with a high engine load, for effective conversion of these elevated nitrogen oxide quantities. In addition, intermediate HC storage can also be provided during the cold starting phase of the engine, during which the NOx conversion activity of the at least one catalytic converter stage following the foremost stage is still relatively low.

In yet another embodiment according to the present invention comprises two successive catalytic converter units separate from one another. Both units are designed with at least two stages, with the first stage being effective in a relatively low-temperature range as far as NOx conversion is concerned and with the second stage being active in conversion at a higher temperature range for NOx. The catalytic converter unit that is located at the front, looking in the exhaust flow direction, is located near the engine so that the exhaust, during the cold starting phase of the engine at a point in time that is as early as possible, enters the converter unit at a temperature at which its first catalytic converter stage produces an effective NOx conversion.

An improvement on the dual catalytic converter unit system just described by means of a bypass line located parallel to the zones of the first catalytic converter unit in the exhaust line charged with catalyst material, ensures that the second catalytic converter unit also always receives exhaust that contains sufficient HC enrichment for effective NOx conversion in this rear catalytic converter unit, even when the hydrocarbons contained in the exhaust component that flows through the catalytically active zones of the first catalytic converter unit are completely converted therein.

To ensure sufficient HC exhaust enrichment for a downstream catalytic converter stage, an integrated through lengthwise flow channel is provided in at least one catalytic converter stage located upstream, the channel not being charged with NOx conversion-active catalyst material. The HC enrichment contained in the exhaust component that flows through this lengthwise flow channel is consequently not used in the at least one catalytic converter stage located upstream and is available for the next stage.

In another embodiment, secondary HC injection into the system produces temperatures that are sufficient to burn solid carbon black particles deposited on the surface of the catalyst. This contributes to a significant reduction of solid carbon black particle emissions from Diesel engines.

Other objects, advantages and novel features of the present invention will become apparent from the following detailed description of the invention when considered in conjunction with the accompanying drawings.

DESCRIPTION OF THE PREFERRED EMBODIMENTS

Figure 1:
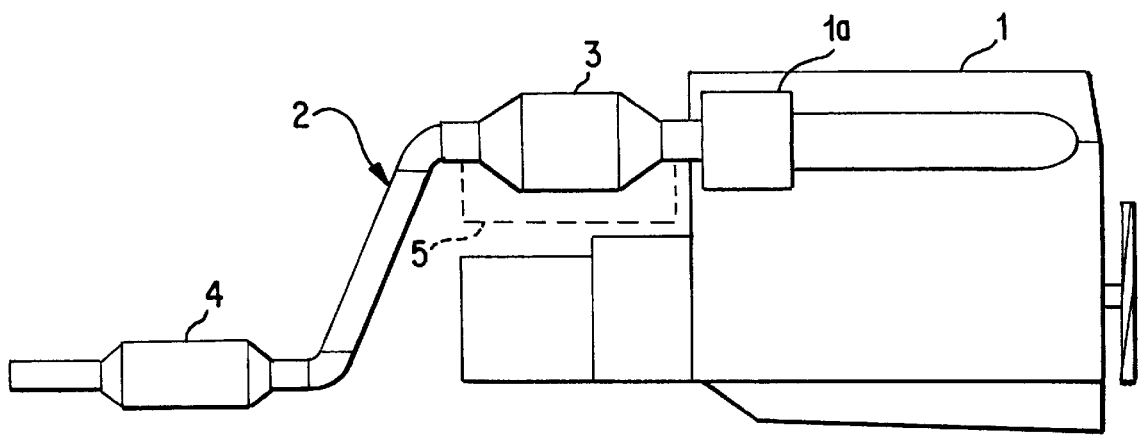
FIG. 1 is a schematic block diagram of a Diesel engine with an associated exhaust catalytic converter.

FIG. 1 shows a Diesel engine 1 with an exhaust turbocharger 1a to which an exhaust catalytic converter system with an exhaust line 2 is connected, in which system two separate catalytic converter units 3, 4 are mounted in series. Diesel engine 1 contains, in a conventional manner not shown in greater detail, means for HC enrichment of the Diesel engine exhaust to support nitrogen oxide conversion in the exhaust catalytic converter, with these means being formed by a secondary injection device with which a quantity of fuel is injected into the combustion chamber of each cylinder by means of a magnetic injection valve that also serves for injection of the fuel for the combustion process, following the end of the actual combustion process. This secondary injected fuel volume is consequently not burned and serves as HC enrichment in Diesel engine exhaust and improves NOx conversion significantly in a certain temperature window.

Figure 4:
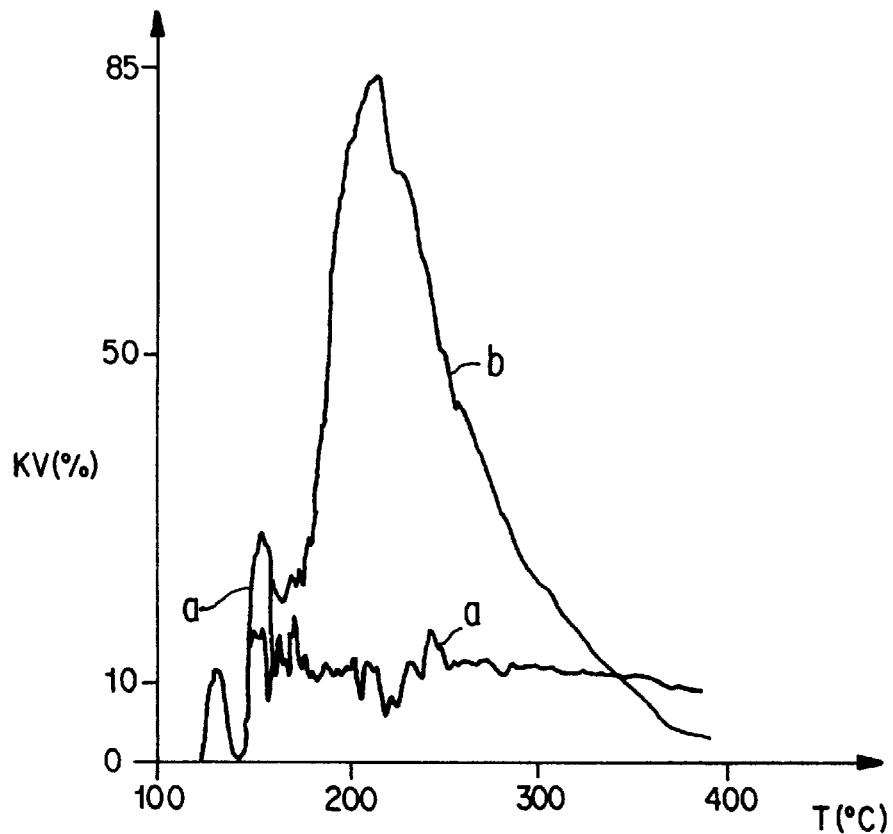
FIG. 4 is a diagram showing hydrocarbon-reinforced NOx conversion as a function of temperature for a catalytic converter unit of the type shown in FIGS. 2 and 3.

One example of this behavior is shown diagrammatically in FIG. 4. Curve (a) shows the degree of NOx conversion (KV) as a function of the temperature for the case in which a Diesel engine exhaust with 340 ppm NOx is enriched with 30 ppm of a propene-propane mixture with a mixture ratio of 1/1. It turns out that the NOx conversion degree (KV) is relatively low in the entire temperature range between 100° C. and 380° C. and is mainly under 20%. On the other hand, curve (b) shows the NOx conversion degree (KV) that results for an exhaust with the same NOx content of 340 ppm but which contains an enrichment of 1200 ppm of the propene-propane mixture in a mixture ratio of 1:1. Clearly, this elevated propene-propane enrichment of the exhaust results in a clear increase in NOx conversion rate in a temperature window between approximately 100° C. and 300° C., with a peak value of about 85%. Additional test results show that this temperature window can be shifted with effective NOx conversion by choosing different catalyst materials and especially by selecting different charging densities of the selected catalyst. Thus, increasing the charging density of NOx conversion-active catalyst, for example platinum or a similar noble metal, shifts the active temperature window toward lower temperatures.

Figure 2:
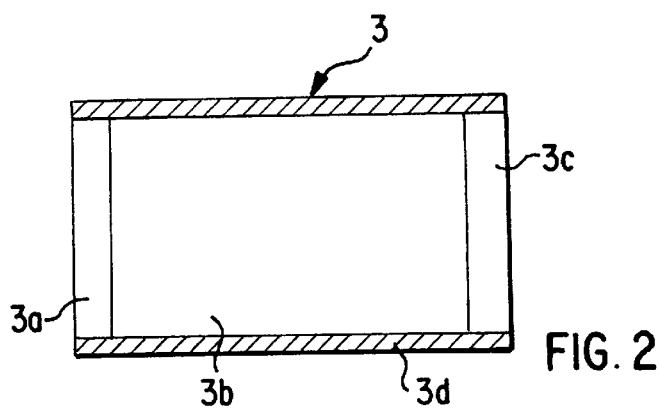
FIG. 2 is a schematic lengthwise section through a catalytic converter unit, located near the engine, of the exhaust catalytic converter of FIG. 1.

This discovery is utilized in the exhaust catalytic converter in FIG. 1 in such fashion that each of the two catalytic converter units 3, 4 is made up of several stages, as shown in greater detail for the forward catalytic converter unit 3 shown in FIG. 2 which is located near the engine. As may be seen from FIGS. 2 and 3, this catalytic converter unit 3 located near the engine consists of a relatively short first stage 3a, a connected, clearly longer second stage 3b, and another relatively short third stage 3c connected to stage 3bThe first catalytic converter stage 3a contains a catalyst charge with platinum or another NOx-reduction-active noble metal material with a high charge density, which means, as explained above, that the active temperature window for NOx conversion as a result of this first catalytic converter stage 3a lies in a temperature range that is as low as possible, and which permits effective NOx reduction even slightly above room temperature. The limited length of this first stage 3a means that it is not the entire secondary injected HC enrichment volume in the exhaust from the first stage 3a that is consumed but a sufficient HC quantity in the exhaust for the next catalytic converter stage 3b, 3c of catalytic converter unit 3 so that effective NOx conversion can still take place in these stages 3b, 3c.

The second, middle catalytic converter stage 3b comprises the majority of the length of catalytic converter unit 3 and contains a charge of the same catalyst material as the first stage 3a, but with a much lower charge density. Typically the charge density in the front catalytic converter stage 3a is higher by a factor of 8 to 10 than that of the middle stage 3b, whose charging density with platinum or palladium for example is between 10 g/ft$^3$ to 100 g/ft$^3$, for example, 50 g/ft$^3$. As mentioned above, this means that the middle catalytic converter stage 3b is NOx-reduction-active at a higher temperature range than the first stage 3a. The second stage 3b is tuned to the first stage 3a in such fashion that its active temperature window adjoins that of the first stage 3a, so that with the two catalytic converter stages 3a, 3b connected in series, a relatively wide temperature range is covered for effective NOx conversion. In addition, the middle catalytic converter stage 3b is packed with a conventional HC adsorber material for temporary HC intermediate storage. The final, third catalytic converter stage 3c is roughly identical to the first catalytic converter stage 3a, in other words it contains the same catalytic converter material that is very NOx-reduction-active with a higher charging density than the first stage 3a, on a zeolite carrier for example, and also has a comparable limited length in the exhaust flow direction.

Figure 3:
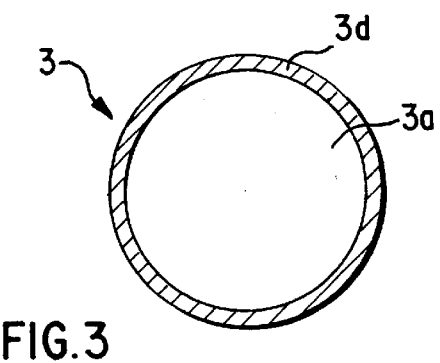
FIG. 3 is top view of the exhaust inlet of the catalytic converter unit of FIG. 2.

The three successive catalytic converter stages 3a, 3b, 3c with NOx-reduction-active catalyst charges are surrounded by a lengthwise flow channel made in the form of an annular duct 3d, the duct being shown shaded in FIGS. 2 and 3 and extending all the way through from the inlet to the outlet ends of catalytic converter unit 3. The volume of this outer annular duct 3d contains no NOx-reduction-active catalyst material, while a charge of HC adsorber material can be provided optionally. The exhaust portion that flows through this outer annular duct 3d thus does not undergo any NOx conversion therein and passes together with the nitrogen oxides contained as well as the HC enrichment volume, possibly minus an HC component stored there on an intermediate basis by adsorption, untreated through the first catalytic converter unit 3. This exhaust component can then be treated in the second catalytic converter unit 4 located downstream; in particular, it can be NOx-reduced. The outer annular duct 3d thus forms a bypass line integrated into the forward catalytic unit 3 for the portion of the exhaust gas to be scrubbed by the rear catalytic converter unit 4. Alternatively to this integrated bypass line in the form of outer annular duct 3d, an external bypass line 5 can be provided that surrounds catalytic converter unit 3 near the engine and is shown shaded in FIG. 1.

The subsequent conversion of a residual NOx exhaust component in the second catalytic converter unit 4 connected downstream makes it possible to make the front, first catalytic converter unit 3 relatively small, so that even where space is limited it can be located very close to the exhaust outlet from Diesel engine 1 and nevertheless can have a high total catalyst volume. Such high catalyst volumes are desirable to achieve lower exhaust space velocity since this helps good exhaust pollutant conversion. It also turns out that by virtue of this design for the exhaust catalytic converter with a low exhaust space velocity and the secondary injected HC enrichment volume, significant combustion of deposited carbon black particles is achieved even in engine rpm ranges in which this is not the case for conventional systems. The structure of the catalytic converter 4 located downstream preferably corresponds to that of the forward catalytic converter unit 3 as described above with reference to FIGS. 2 and 3, i.e. consisting of a forward, shorter, highly active stage, a middle, longer, less active stage, and another active, shorter rear stage, with the exception that in this catalytic converter unit 4, the outer annular duct 3d that functions as an integrated bypass line is absent.

After starting Diesel engine 1, because of the exhaust temperature still being low, it is initially the forward, first stage 3a of the catalytic converter unit 3 near the engine that is active as far as pollutant conversion, especially NOx reduction, is concerned. The hydrocarbons that are contained in the exhaust component that flows through outer annular duct 3d of catalytic converter 3 near the engine are stored on an intermediate basis by the HC adsorber material that may be provided there and also by the HC adsorber material contained in the middle stage of the catalytic converter 4 located downstream. Likewise the HC component flowing through the first stage 3a of catalytic converter 3 located near the engine and not converted therein is stored on an intermediate basis in the following, second catalytic converter stage 3b.

As soon as the exhaust temperature in this middle stage 3b and the rear stage 3c of catalytic converter 3 near the engine reaches its active temperature window, pollutant conversion begins in these two stages 3b, 3c as well, with the hydrocarbons stored on an intermediate basis being desorbed and promoting NOx reduction. A relatively early beginning of the catalyst activity of middle stage 3b is supported by the fact that the exhaust temperature is increased slightly by the active pollutant conversion that takes place at relatively low temperatures in the first stage 3a located upstream, so that the exhaust enters the middle stage 3b at an elevated temperature already. In addition, the temperature increase caused by pollutant conversion in catalytic converter 3 near the engine means that the exhaust from this forward catalytic converter unit 3 escapes at a comparatively high temperature and therefore the catalytic converter 4 located downstream has an inlet temperature that is still relatively high, so that effective pollutant conversion can take place there as well over essentially the entire length of catalytic converter 4. Of course, the lengths of the two catalytic converters 3, 4 and their individual stages 3a, 3b, and 3c are adjusted so that when engine 1 is warmed up and running, all catalytic converter stages 3a, 3b, 3c of both catalytic converters 3, 4 contribute to pollutant conversion and especially to NOx reduction.

The HC intermediate storage made possible by the HC adsorber material added is useful not only during the cold starting phase but also during the warmed-up running of the engine to achieve a constant high NOx conversion rate with NOx concentration fluctuations in the exhaust, resulting from variations in engine load. During operating phases with a reduced engine load and hence a lower NOx concentration, fewer hydrocarbons are required for NOx reduction and therefore they are stored on an intermediate basis in order to be able completely to convert the increased nitrogen oxide volumes then found in the exhaust during operating phases with a higher engine load, without the secondary injected HC enrichment volume having to be changed for this purpose in synchronization with the changing load.

Figure 5:
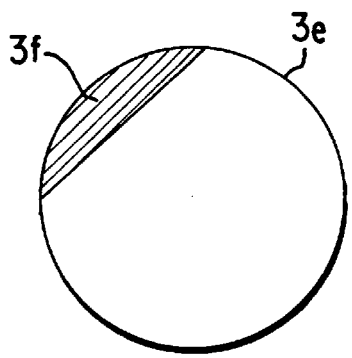
FIG. 5 is a schematic top view of the exhaust inlet of a first version of the catalytic converter unit shown in FIGS. 2 and 3.

FIG. 5 shows a variation 3e of the catalytic converter 3 located near the engine, which has been modified as far as the design of the lengthwise flow duct, not charged with catalyst material, is concerned. In this catalytic converter unit 3e, this lengthwise flow channel with an optional HC adsorber material charge consists of a lengthwise channel 3f segmented in cross section, whose extent in the circumferential direction is limited to 90°.

Figure 6:
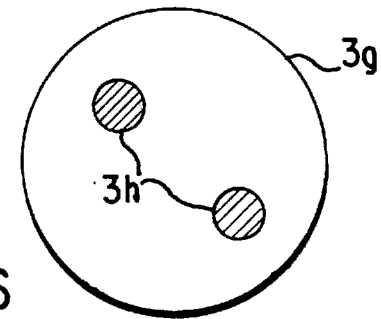
FIG. 6 is a schematic top view of the exhaust inlet of a second version of the catalytic converter unit in FIGS. 2 and 3.

FIG. 6 shows another variation 3g on catalytic converter 3 located near the engine, in which the lengthwise flow channel is formed without a charge of catalyst material and filled with an optional HC adsorber material by two separate lengthwise channels 3h that are circular in cross section. The ratio of the exhaust that flows through the integrated bypass line formed by lengthwise flow channels 3d, 3f, 3h to that which flows through the other conversion-active part of the first catalytic converter 3, 3e, 3g can be adjusted by a suitable choice of the cross sectional area for the lengthwise flow channel 3d, 3f, 3h for a given total cross sectional area of catalytic converter unit 3, 3e, 3g in desired fashion.

Of course in addition to the exhaust catalytic converter described above, other systems according to the invention are possible, for example those in which the individual stages 3a, 3b, 3c of catalytic converters 3, 4 shown are in turn made in the form of independent catalytic converter units. In addition, depending on the application, only a single catalytic converter can be provided which comprises at least the above-described highly active forward catalytic converter stage 3a with a limited length and the following second catalytic converter stage 3b with a low catalyst activity and a greater length.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An exhaust catalytic converter for a Diesel engine that enriches the Diesel engine exhaust with hydrocarbons, said hydrocarbons reinforcing nitrogen oxide conversion within the catalytic converter, said catalytic converter comprising:
    (A) a first catalytic converter stage designed for NOx conversion in a first temperature range consuming a first part of a HC enrichment volume in the exhaust and having a first catalyst material charge; and
    (B) a second catalytic converter stage located downstream from the first catalytic converter stage in the exhaust flow direction, said second stage being designed for NOx conversion in a second temperature range higher than the first temperature range, consuming a second part of the HC enrichment volume in the exhaust, and having a second catalyst material charge.

2. A catalytic converter according to claim 1, further comprising a third catalytic converter stage following the second stage in the exhaust flow direction, said third stage comprising a third catalyst material charge that is more active in terms of NOx conversion than the second catalyst material charge.

3. A catalytic converter according to claim 1 or 2, further comprising an HC adsorber material at least in the second catalytic converter stage.

4. A catalytic converter according to claim 1 or 2, comprising a first catalytic converter unit located next to the engine and a separate second catalytic converter unit following the first catalytic converter unit in the exhaust flow direction, said units both being at least two-stage, with the forward, first catalytic converter stage having a high catalyst activity and a low temperature range for activity, the following, second catalytic converter stage with a low catalyst activity and a high temperature range for activity.

5. A catalytic converter according to claim 3, comprising a first catalytic converter unit located next to the engine and a separate second catalytic converter unit following the first catalytic converter unit in the exhaust flow direction, said units both being at least two-stage, with the forward, first catalytic converter stage having a high catalyst activity and a low temperature range for activity, the following, second catalytic converter stage with a low catalyst activity and a high temperature range for activity.

6. A catalytic converter according to claim 4, further comprising a bypass line that bypasses the catalytic converter stages of the first catalytic converter unit located next to the engine.

7. A catalytic converter according to claim 5, further comprising a bypass line that bypasses the catalytic converter stages of the first catalytic converter unit located next to the engine.

8. A catalytic converter according to one of claims 1 or 2, wherein at least one of the catalytic converter stages located upstream in the exhaust flow direction of a following catalytic converter stage has a lengthwise flow channel that is not charged with NOx-conversion-active catalyst material, and is optionally charged with HC adsorber material.

9. A catalytic converter according to claim 3, wherein at least one of the catalytic converter stages located upstream in the exhaust flow direction of a following catalytic converter stage has a lengthwise flow channel that is not charged with NOx-conversion-active catalyst material, and is optionally charged with HC adsorber material.

10. A catalytic converter according to claim 4, wherein at least one of the catalytic converter stages located upstream in the exhaust flow direction of a following catalytic converter stage has a lengthwise flow channel that is not charged with NOx-conversion-active catalyst material, and is optionally charged with HC adsorber material.

11. A catalytic converter according to claim 1, further including means for injecting secondary HC injection into the exhaust catalytic converter to thereby produce temperatures that are sufficient to burn solid carbon black particles deposited on the surface of the catalyst material.

* * * * *